(12) United States Patent
Hajjar et al.

(10) Patent No.: US 6,647,185 B2
(45) Date of Patent: Nov. 11, 2003

(54) OPTICAL INTERFEROMETRIC MODULATOR INTEGRATED WITH OPTICAL MONITORING MECHANISM

(75) Inventors: Roger A. Hajjar, San Jose, CA (US); John M. Beley, Moorpark, CA (US); Philip Chang, San Jose, CA (US)

(73) Assignee: Vitesse Semiconductor Corporation, San Jose, CA (US)

( * ) Notice: Subject to any disclaimer, the term of this patent is extended or adjusted under 35 U.S.C. 154(b) by 107 days.

(21) Appl. No.: 10/076,020

(22) Filed: Feb. 12, 2002

(65) Prior Publication Data

US 2003/0035606 A1 Feb. 20, 2003

Related U.S. Application Data

(63) Continuation-in-part of application No. 09/797,783, filed on Mar. 1, 2001, now Pat. No. 6,421,483.

(60) Provisional application No. 60/260,581, filed on Jan. 9, 2001, provisional application No. 60/268,430, filed on Feb. 12, 2001, and provisional application No. 60/274,131, filed on Mar. 7, 2001.

(51) Int. Cl.[7] .................................................. G02B 6/42
(52) U.S. Cl. ........................ 385/48; 385/2; 385/14; 385/40
(58) Field of Search .............................. 385/2, 3, 14, 15, 385/40, 42, 48

(56) References Cited

U.S. PATENT DOCUMENTS

| 4,936,645 A | 6/1990 | Yoon et al. |
| 6,181,456 B1 | 1/2001 | McBrien et al. |
| 6,298,178 B1 | 10/2001 | Day et al. |

*Primary Examiner*—Edward J. Glick
*Assistant Examiner*—Elizabeth Keaney
(74) *Attorney, Agent, or Firm*—Fish & Richardson P.C.

(57) ABSTRACT

Techniques for optically sampling the output of a Mach-Zehnder electro-optic modulator without interfering the output optical signal.

18 Claims, 11 Drawing Sheets

POSITION THE DETECTOR ABOVE THE OUTPUT WAVEGUIDE $(X=0)$ AT A SELECTED HEIGHT $(Z_0)$

↓

ADJUST THE Y POSITION OF THE DETECTOR ALONG THE DIRECTION OF THE OUTPUT WAVEGUIDE TO BE AWAY FROM THE OUTPUT FACET OF THE OUTPUT WAVEGUIDE ON THE EDGE OF THE CRYSTAL BY MONITORING THE DETECTOR OUTPUT

↓

FIX THE POSITION OF THE DETECTOR ALONG THE DIRECTION OF THE OUTPUT WAVEGUIDE AT A LOCATION WHERE THE PEAK SIGNALS OF THE DETECTOR OUTPUT ARE SUBSTANTIALLY EQUAL

*FIG. 8*

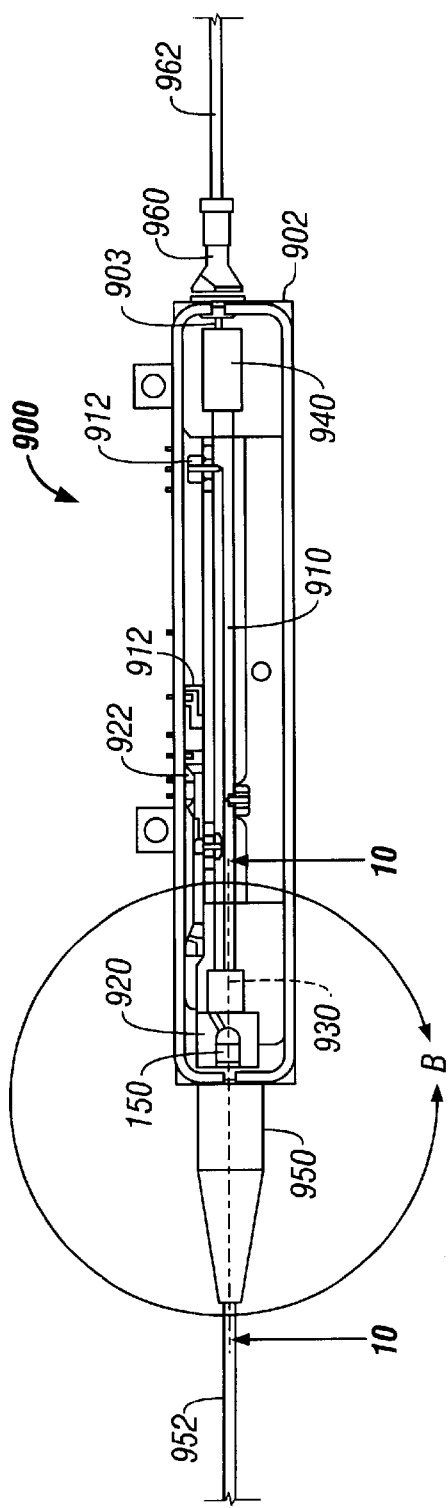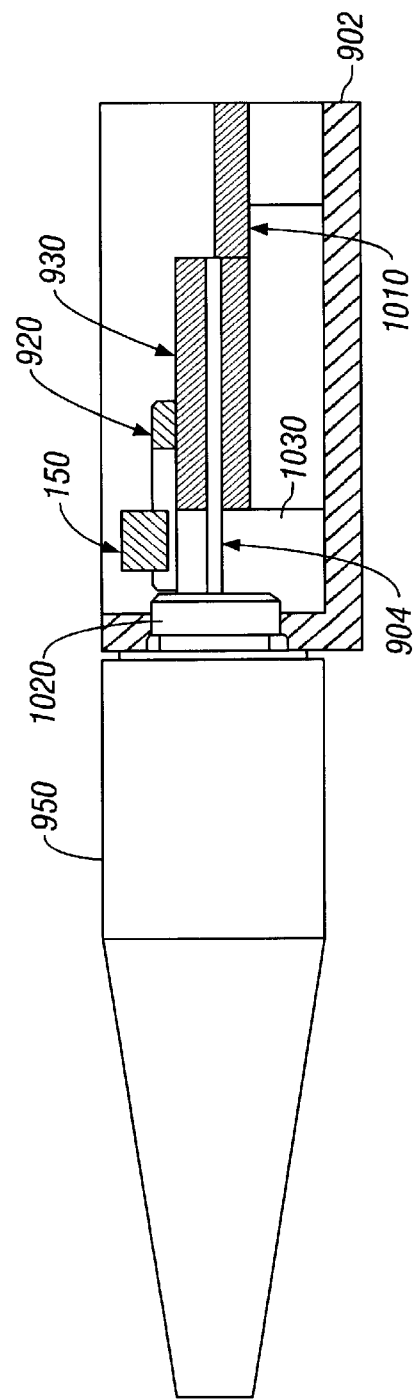
FIG. 9
FIG. 10

US 6,647,185 B2

OPTICAL INTERFEROMETRIC MODULATOR INTEGRATED WITH OPTICAL MONITORING MECHANISM

This application is a continuation-in-part application of U.S. application Ser. No. 09/797,783 entitled "OPTICAL MONITORING IN OPTICAL INTERFEROMETRIC MODULATORS" and filed Mar. 1, 2001 now U.S. Pat. No. 6,421,483 which claims the benefit of U.S. Provisional Application No. 60/260,581 filed Jan. 9, 2001. This application further claims benefits of U.S. Provisional Application No. 60/268,430 filed Feb. 12, 2001 and No. 60/274,131 filed Mar. 7, 2001. The disclosures of the above-related applications are incorporated herein by reference as part of the specification of this application.

BACKGROUND

This application relates to optical interferometric modulators for modulating light and devices incorporating such modulators.

Certain optical interferometric modulators, such as Mach-Zehnder electro-optic modulators, modulate the intensity of light based on interference of beams from two optical paths. At least one optical path is designed to have an electro-optic material so that a control voltage can be applied to modify the refractive index of the electro-optic material and hence the total optical path length. An input optical signal is split into two optical signals that are respectively coupled into the two optical paths. The two optical signals undergo different optical path lengths and hence are delayed relative to each other. The two optical signals are then spatially combined to interfere with each other to generate an output optical signal.

The amount of the delay can be adjusted or modulated by the control voltage applied across the electro-optic material. Hence, when the relative delay between the two optical signals is 0, or $2\pi$, etc., the two signals constructively interfere to produce a maximum intensity output. However, when the relative delay is $\pi$, or $3\pi$, etc., the two signals destructively interfere to produce a minimum intensity output.

SUMMARY

The present disclosure includes techniques for optically monitoring the output optical signals of the above Mach-Zehnder modulators and, more generally, the output optical signals of optical interferometric modulators that use the optical interference between two optical paths to produce an intensity-modulated output optical signal. Such optical monitoring uses another optical signal that is ordinarily unused in such an optical modulator and thus does not optically tap the output optical signal of the modulator.

A device according to one embodiment includes an input waveguide, an output waveguide, and first and second waveguides formed on a substrate. The first and second waveguides respectively have receiving ends coupled to a port of the input waveguide and output ends coupled to a port of the output waveguide. An optical output coupling mechanism is provided to have one end coupled to the output waveguide and another end coupled to an output optical fiber which receives a guided output optical signal from the output waveguide. The device also includes an optical detector, displaced from the substrate and positioned near the optical output coupling mechanism, to receive an optical monitor signal that is not guided by either the output waveguide or the output optical fiber. In particular, this unguided optical monitor signal is complementary to the guided output signal.

An electro-optic material may be used in either or both of the first and the second waveguides to control the difference in the optical path length for the interference operation. The unguided optical monitor signal may be used to obtain information that is contained in said guided signal, without directly intercepting the guided signal. For example, the unguided optical monitor signal may be used to detect a drift in the optical path length difference between the first and second waveguides with respect to a desired value. A feedback control may be used to control the electro-optic material in response to the unguided optical monitor signal to reduce the drift. In another example, the unguided optical monitor signal may be used to monitor other aspects of the device, such as the bit error rate in the guided output optical signal.

BRIEF DESCRIPTION OF DRAWINGS

FIG. 8 shows a flowchart for optimizing the location of the detector based on the signals shown in FIGS. 7A and 7B.

FIG. 9 shows one implementation of the designs shown in FIG. 6 and FIG. 1.

FIGS. 10, 11A, 11B, and 11C show mounting of the sampling detector for the implementation of FIG. 9 based on the design in FIG. 6.

DESCRIPTION

Figure 1:
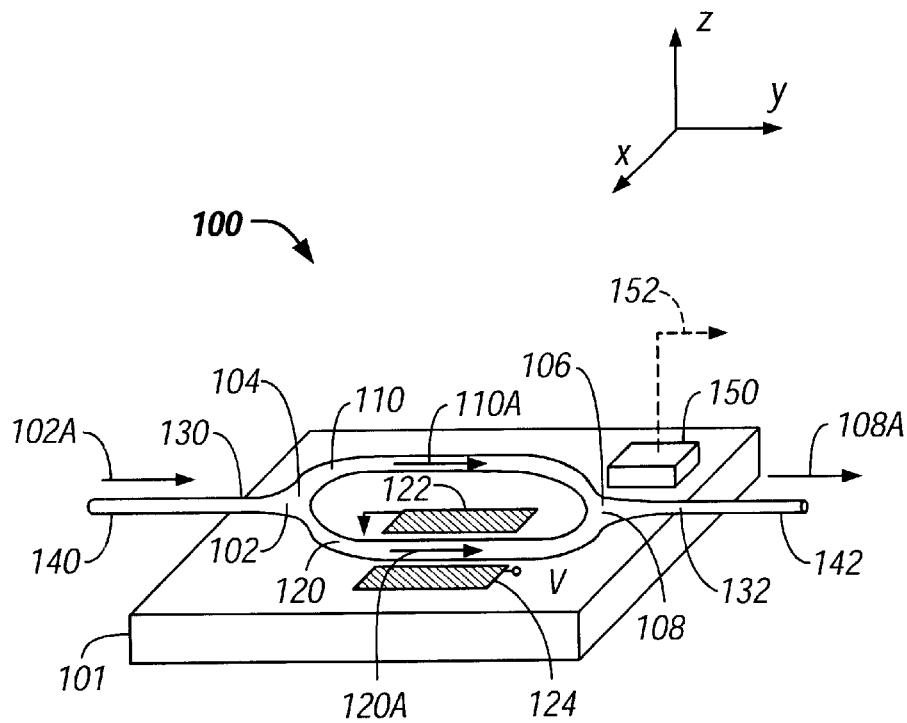
FIG. 1 illustrates a Mach-Zehnder electro-optic modulator with an optical sampling detector according to one embodiment.

FIG. 1 shows a Mach-Zehnder electro-optic modulator 100 as an example for a general optical interferometric modulator to illustrate the optical monitoring technique according to one embodiment. The modulator 100 is formed over a substrate 101. Optical dielectric waveguides 102, 110, 120, and 108 are fabricated on the substrate 101. The waveguide 102 is the input waveguide to receive an input optical signal 102A. The waveguide 108 is the output waveguide to output an output optical signal 108A. The waveguides 110 and 120 constitute two interference branches for the interference operation.

An optical waveguide coupler 104 is formed as an input port to couple receiving ends of the waveguides 110 and 120 to the output end of the input waveguide 102. The input signal 102A in the input waveguide 102 is thus split by the coupler 104 into a first signal 110A in the waveguide 110 and a second signal 120A in the waveguide 120. At least a portion of the waveguide 120 includes an electro-optic material whose refractive index changes in response to a control voltage. Electrodes 122 and 124 are fabricated on two sides of the waveguide 120 to supply this control voltage. The change in the refractive index of the electro-optical material changes the total optical path length (i.e., a sum of the products of the index and the physical length of all segments in the path) of the waveguide 120. This change can be used to control the difference in the optical path length of the two waveguides 110 and 120. Alternatively, both waveguides 110 and 120 may include electro-optic portions.

Another optical waveguide coupler 106 is also formed on the substrate 101 as an output port to join the output ends of the waveguides 110 and 120 to the receiving end of the output waveguide 108. Hence, the two optical signals 110A and 120A meet and optically interfere with each other at the coupler 106 to produce the output signal 108A. Notably, the output signal 108A is optically guided by the output waveguide 108. The output signal 108A has a maximum amplitude when the total difference in optical path lengths of the two signals 110A and 120A at the coupler 106 is equal to $K\lambda$ (i.e., a constructive interference) and has a minimum amplitude when the difference is $(2K+1)\lambda$ (i.e., a destructive interference), where $K=0, \pm 1, \pm 2, \ldots$. In terms of the amount of the relative delay between the two optical signals 110A and 120A, the maximum amplitude in the output 108A is produced when the delay is 0, or $2\pi$, etc., and the minimum amplitude in the output signal 108A is produced when the relative delay is $\pi$, or $3\pi$, etc.

Figure 4:
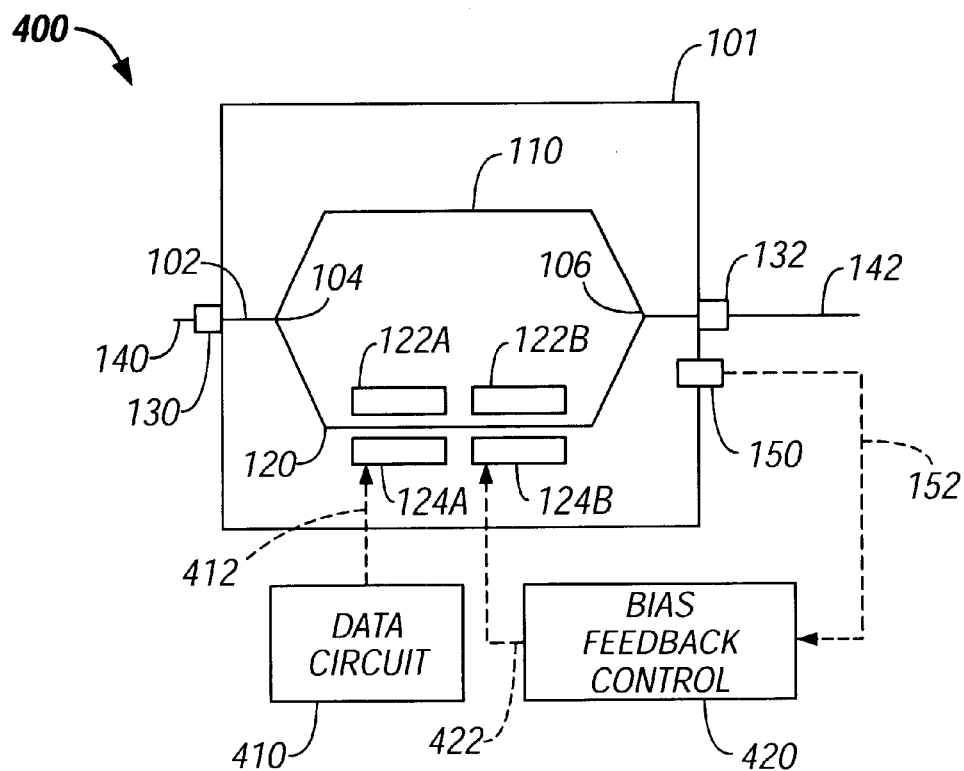
FIG. 4 shows a bias feedback control based on the output of the optical sampling detector in FIG. 1.

Hence, by controlling the voltage on the electrodes 122 and 124 to change the optical path length difference between $(2K+1)\lambda$ and $2K\lambda$, the device 100 can turn off and on the guided output signal 108A to operate as an optical switch or an optical modulator. In general, the electro-optic material may be electrically biased at a selected DC voltage. An AC control voltage is then applied over the DC bias voltage to control or modulate the guided output signal 108A. Referring to FIG. 4, the pair of electrodes 122 and 124 may include two separate subsets of electrodes with one subset (122B and 124B) electrically coupled to provide the DC bias and the other subset (122A and 124A) electrically coupled to provide the AC control voltage.

It is recognized that, in addition to the above guided output optical signal 108A in the guided mode, a portion of the optical energy produced by the optical interference at the coupler 106 also dissipates outside the output waveguide 108 in an unguided mode into the surrounding areas of the coupler 106, including the substrate 101. Under the conservation of energy at the coupler 106, the total sum of this unguided portion and the guided portion 108 is equal to the total sum of the received signals 110A and 110B by the coupler 106. Hence, when the interference is constructive, the output signal 108A reaches its maximum while the unguided portion is at its minimum. Conversely, when the interference is destructive, the output signal 108A reaches its minimum while the unguided portion is at its maximum. Therefore, the strength of this unguided portion of the optical energy is complementary to the strength of the guided output signal 108A. As a result, any signal variation in the guided signal 108A, such as a change in amplitude, can be faithfully represented by a complementary variation in the unguided portion.

In particular, this unguided portion of optical energy can be collected and measured without optically affecting the guided signal 108A. This is because this unguided portion of optical energy is not guided by the output waveguide 108 and hence there is no need to optically tap the output signal 108A either at the output waveguide 108 or somewhere in the downstream of the output waveguide 108 in order to monitor the guided signal 108A. The unguided portion can be collected at a location where the unguided portion of energy is present.

For example, as illustrated in FIG. 1, an optical detector 150 may be positioned above the output waveguide 108 over the substrate 101 to receive the unguided portion and to produce an optical monitoring signal 152 that is complementary to the output signal 108A. Notably, the optical detector 150 need not be optically coupled to receive the guided output signal 108A and therefore the presence and operation of the detector 150 do not interfere with any aspect of transmission and subsequent processing of the output signal 108A. A lens, a lens combination, or other suitable optical collecting element, may be positioned between the substrate 101 and the detector 150 to increase the effective collecting aperture of the detector 150.

It is further recognized that, the unguided portion of the optical energy in the substrate 101 emanates outside the substrate at the boundary of the substrate 101 near the output waveguide 108. Hence, the detector 150 may be positioned above the output end of the output waveguide 108 at the edge of the substrate 101 to collect the unguided portion.

Figure 2:
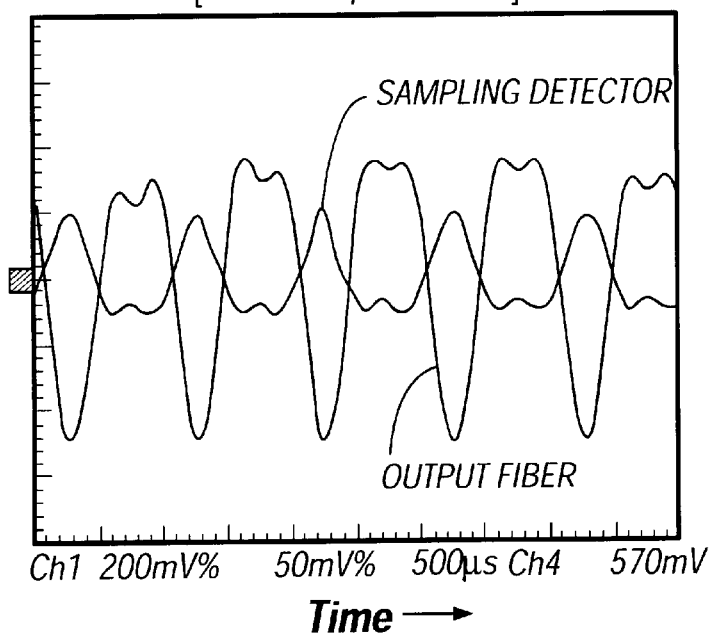
FIG. 2 shows measured output signals from the optical sampling detector and the output port of the device in FIG. 1.

In applications where optical fibers are used, the output waveguide 108 may be coupled to send the output signal 108A to an output fiber 142. A facet of a fiber may be directly coupled to the facet of the waveguide 108 on the edge of the substrate 101 to form a waveguide-fiber interface 132 for receiving the guided signal 108A from the waveguide 108. Alternatively, a waveguide-to-fiber coupler may be used at the interface 132 to facilitate the waveguide-fiber coupling. For example, such a coupler may be a pigtail fiber coupler. At the input side of the device 100, a fiber-to-waveguide interface 130 may also be formed to couple an input fiber 140 to the input waveguide 102, e.g., by either directly coupling or using a coupler device. In this configuration, the detector 150 may be preferably placed above the interface 132 where the signal strength of the unguided portion is generally higher than other locations along the output waveguide 108. FIG. 2 shows measured output optical signal 108A and the output 152 of the detector 150, where the unguided output 152 is complementary to the guided signal 108A in time domain: the signal 152 increases when the signal 108A decreases, reaches a maximum amplitude when the signal 108A reaches a minimum amplitude, and vice versa.

Figure 3:
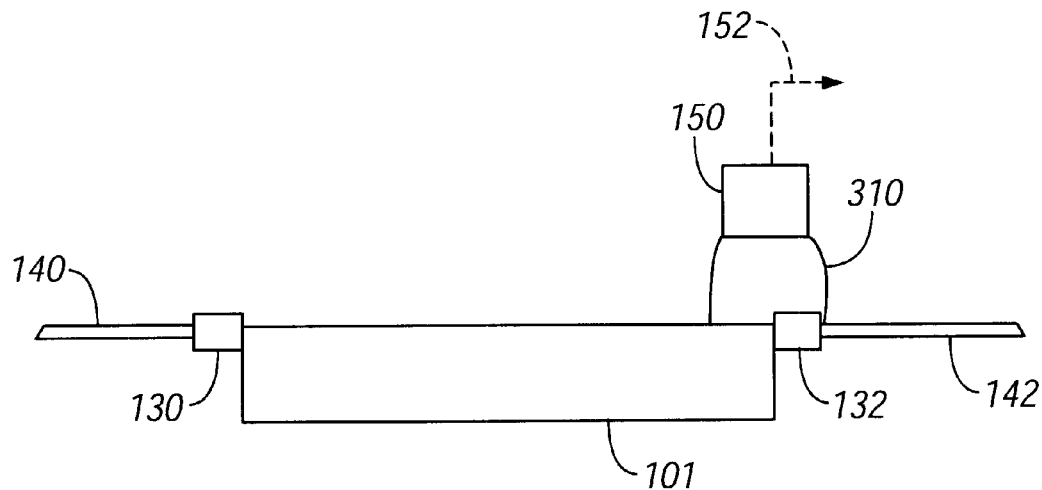
FIG. 3 shows a use of an index-matched dielectric material to fill the gap between the optical sampling detector and the output coupling mechanism in the device of FIG. 1.

FIG. 3 shows that, a transparent dielectric block 310 may be formed in the air gap between the detector 150 and the waveguide-fiber interface 132 to enhance the collection efficiency of the detector 150. The refractive index of the block 310 may approximately match that of the fiber 142. In this configuration, the unguided portion in the substrate 101 propagates along the output waveguide 108 and is emanated outside the substrate 101 at the waveguide-fiber interface 132 where the substrate 101 discontinues. A sufficient portion of the emanated energy is collected into the block 310 to the detector 150.

Alternatively, the optical detector 150 may be formed in the substrate 101 near the output waveguide 108 to collect the unguided portion dissipating into the substrate 101.

The output signal 152 of the detector 150 may be used to monitor the performance of the optical modulator 100. As the example shown in FIG. 4, the modulator may be used to superimpose digital data on the input signal 102A in the waveguide 120 as an optical carrier by applying modulated voltages representing the data across the electrodes 122A and 124A. The electrodes 122B and 124B are biased at a desired DC voltage. A data circuit 410 is used to provide an AC modulation voltage 412 that represents the data. The output signal 152 of the detector 150 may be used to monitor the bit error rate of the output signal 108A.

As another example, the output signal 152 of the detector 150 may also be used to determine whether the DC bias voltage across the bias electrodes 122B and 124 is at or near a DC value so that the DC value of the optical path length difference between the waveguides 110 and 120 at the coupler 106 is biased at a desired value. The DC bias point may be selected to operate the device within a particular linear range, at a minimal zero throughput, or at a half power point of the optical output. In some instances, the bias voltage may be applied to the some or all of the electrodes that apply the AC fields.

However, the DC bias value of the optical path length difference between the waveguides 110 and 120 at the coupler 106 may drift from the desired bias value due to a number of factors. For example, the temperature may vary and hence the physical length and the refractive index of each waveguide may change with the temperature. U.S. Pat. No. 6,181,456 B1 to McBrien et al. describes other common factors that contribute to the bias drift. For example, although a constant DC bias voltage is applied, the actual electric field applied to the electro-optic portion of the waveguide may vary to cause the bias point of the device to drift. Physical impurities, crystal defects, and any causes of both trapped and mobile charges may affect the bias stability of the device. In addition, because the optical waveguides are typically located near the surface of the electro-optic substrate, the crystal composition near the surface affects drift of the bias point via a variety of surface chemistry mechanisms. Even the method used for fabricating the waveguides, often involving infusion or proton exchange processes, may affect the bias point drift, because these techniques generally modify the crystal structure. Such bias drift may adversely affect the performance of the device and hence it is desirable to reduce the drift.

FIG. 4 shows an exemplary electro-optic modulator 400 that uses one active bias feedback control mechanism for reducing the bias drift. The optical detector 150 as described above is used to receive the unguided optical energy emanated from the waveguide-fiber interface 132 and to produce the detector output 152 that is complementary to the guided signal 108A in the output waveguide 108. A bias feedback control unit 420 measures the DC level of the signal 152 which is correlated to the DC level of the guided output signal 108A. Based on this measurement, the control unit 420 determines the bias drift and produces a control signal 422 that adjusts the DC voltage on the electrodes 122B and 124B to reduce the bias drift.

Notably, the unguided signal complementary to the guided signal in the output of the modulator 100 in FIG. 1 or 400 in FIG. 4 varies with position. Referring back to FIG. 1, a xyz coordinate system is shown to have its x axis perpendicular to the output waveguide 108 and parallel to the surface plane of the substrate 101, the z axis perpendicular to the waveguide the surface plane of the supporting substrate 101, and the y axis parallel to the output waveguide 108. In the following description, the origin of the xyz coordinate system is assumed to be at the interfacing point between the output waveguide 108 and the output fiber 142 on the substrate surface. The output fiber 142 also has its axis along the y axis. The detector 150 may be generally located at positions with x=0 and properly selected y and z positions.

Figure 5A:
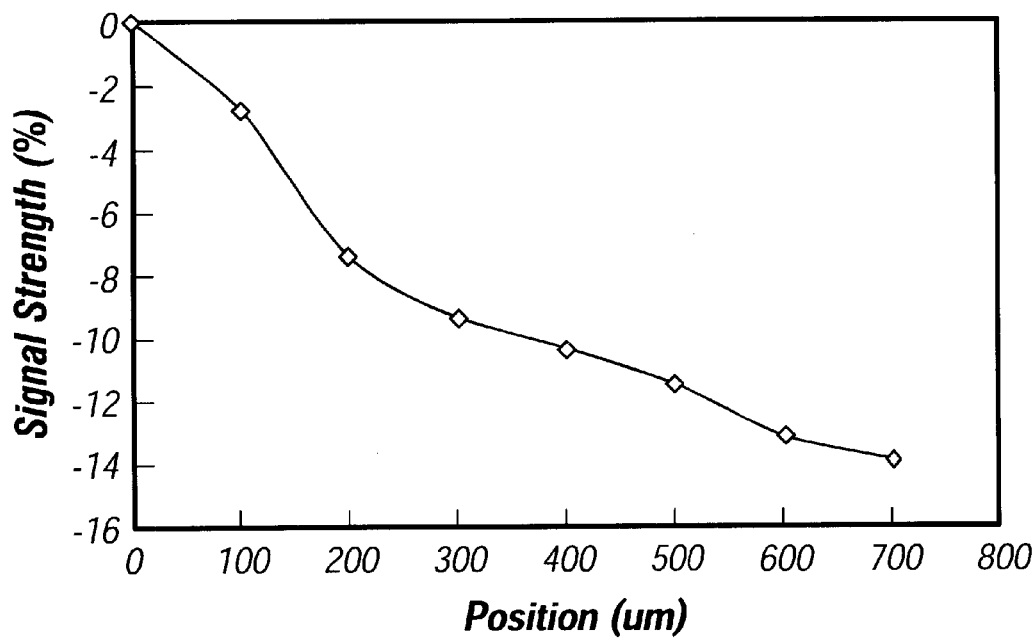
FIGS. 5A and 5B show measured signals as functions of positions in one exemplary optical modulator with the sampling detector according to one embodiment.
Figure 5B:
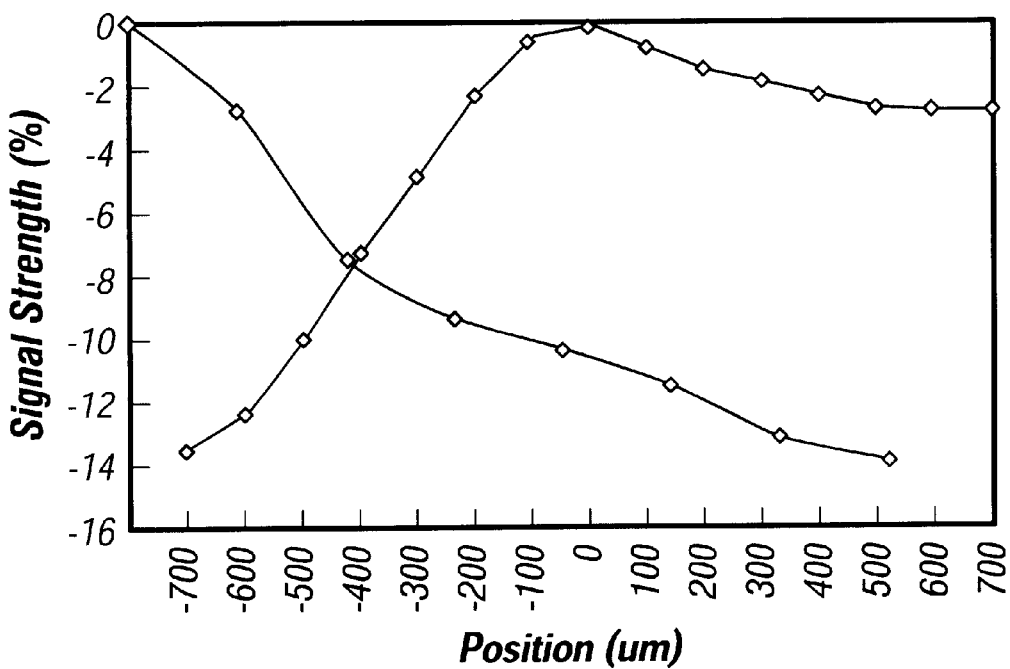

FIG. 5A shows the variation of the unguided complementary signal with respect to the z positions above the substrate surface for a given y (>0) location. The signal strength is expressed in terms of the percentage change from the maximum signal strength measured at z=0. The signal generally decays with z. FIG. 5B further shows the y dependence of the unguided complementary signal at a given z value. The signal is approximately at its maximum right above the interface between the output waveguide 108 and the output fiber 142 and decays along both the +y direction along the output fiber 142 and −y direction along the output waveguide 108 towards the joint 106 of the two waveguides 110 and 120.

In particular, FIG. 5B shows that the unguided complementary signal decays more rapidly along the −y direction than the +y direction. Hence, the detector 150 may generally be located above the interfacing location near the waveguide-fiber interface 132 (y≈0) or above the output fiber 142 (y>0) to achieve a high detection sensitivity. In the embodiment in FIG. 3, for example, the detector 150 is shown to be located approximately above the interfacing point between the output waveguide 108 and the output fiber 142 where the unguided complementary signal is approximately at its maximum.

At the exit facet of the output waveguide 108 at the edge of the substrate 101, however, the guided signal encounters a transition between two different optical media from the waveguide 108 to a different material such as the output fiber 142. In absence of any index-matching mechanism, a portion of the guided signal generally scatters at the exit facet of the output waveguide. The scattered light from the guided light may no longer be in the guide mode and thus may mix with the unguided complementary signal. Hence, when the detector 150 is located at or sufficiently close to the exit facet of the waveguide 108 at the edge of the substrate 101, it may receive the scattered light caused by the scattering of the guided light. This received scattered light is not complementary to the guided signal and therefore contributes noise to the output of the detector 150 which is to detect the unguided complementary signal.

This noise caused by the scattering of the unguided light at the interface 132, however, decays significantly with the distance from the interface 132. In particular, the spatial decay of this noise is faster than the decay of the unguided complementary signal outside both the output waveguide 108 and the output fiber 142. As shown in FIG. 5B, the signal strength of the unguided complementary signal at y>0 decreases from its maximum value at the interface y≈0. However, FIG. 5B also indicates that this decrease is gradual, e.g., approximately a few percent (less than 3%) over a range of at least 700 microns from the interface 132 above the output fiber 142. Measurements show that, the detector 150 may be situated away from the interface 132 to locate at a selected location above the output fiber 142 where $z=z_s>0$, $y=y_s>0$, and x≈0 to reduce the amount of the scattered guided light received by the detector 150. At this location, the detector 150 still receives a significant amount of the unguided complementary signal to achieve an acceptable signal to noise ratio.

The detector 150 may be generally placed above the output fiber with $z_s$ within a few hundred microns (e.g., less than 100 microns) above the output fiber 142. The y position away from the interface 132, $y_s$, may be generally selected by maintaining the signal to noise ratio above an acceptable minimum value.

In one implementation, the y position of the detector 152, $y_s$, may be selected at an optimized $y_o$ by directly observing the amplitude variation of the output signal 152 of the detector 150. This is based on the discovery that, at a given $z_s$ value and x=0, the modulated signal peaks with respect to time in the output signal 152 have substantially the same amplitude when the y position is at this optimized position $y_o$. When the position $y_s$ of the detector 150 deviates from this optimized position, the amplitudes of two adjacent peaks become different.

Figure 6:
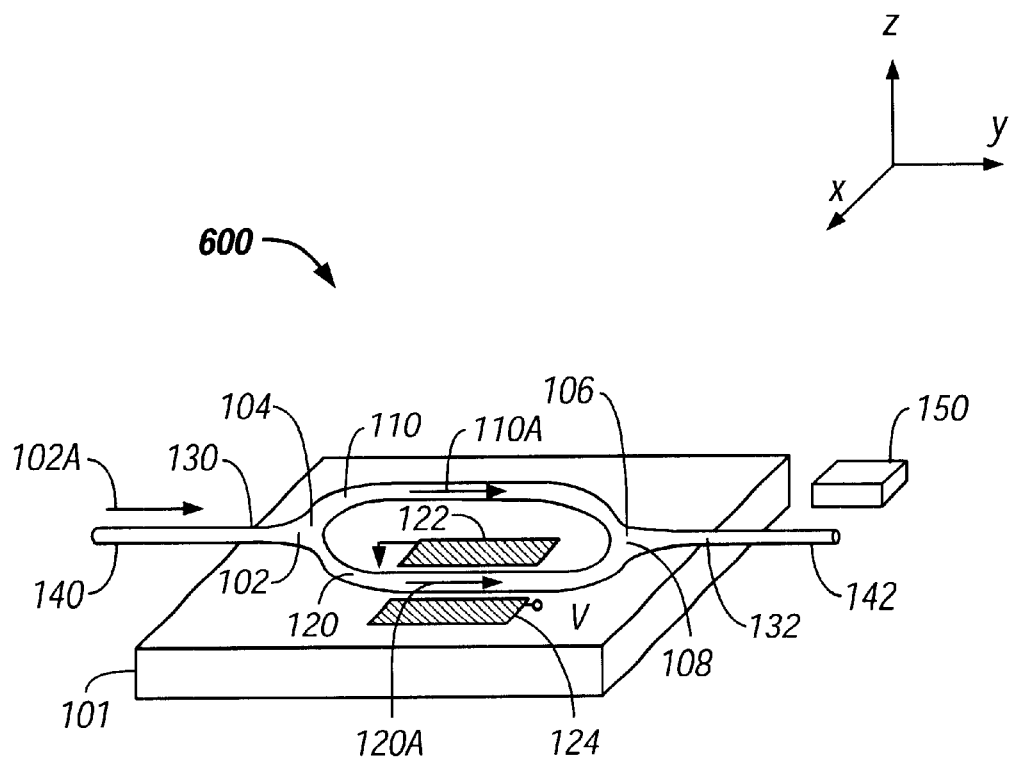
FIG. 6 shows one embodiment of an optical modulator with the sampling detector located away from the edge of the modulator substrate.
Figure 7A:
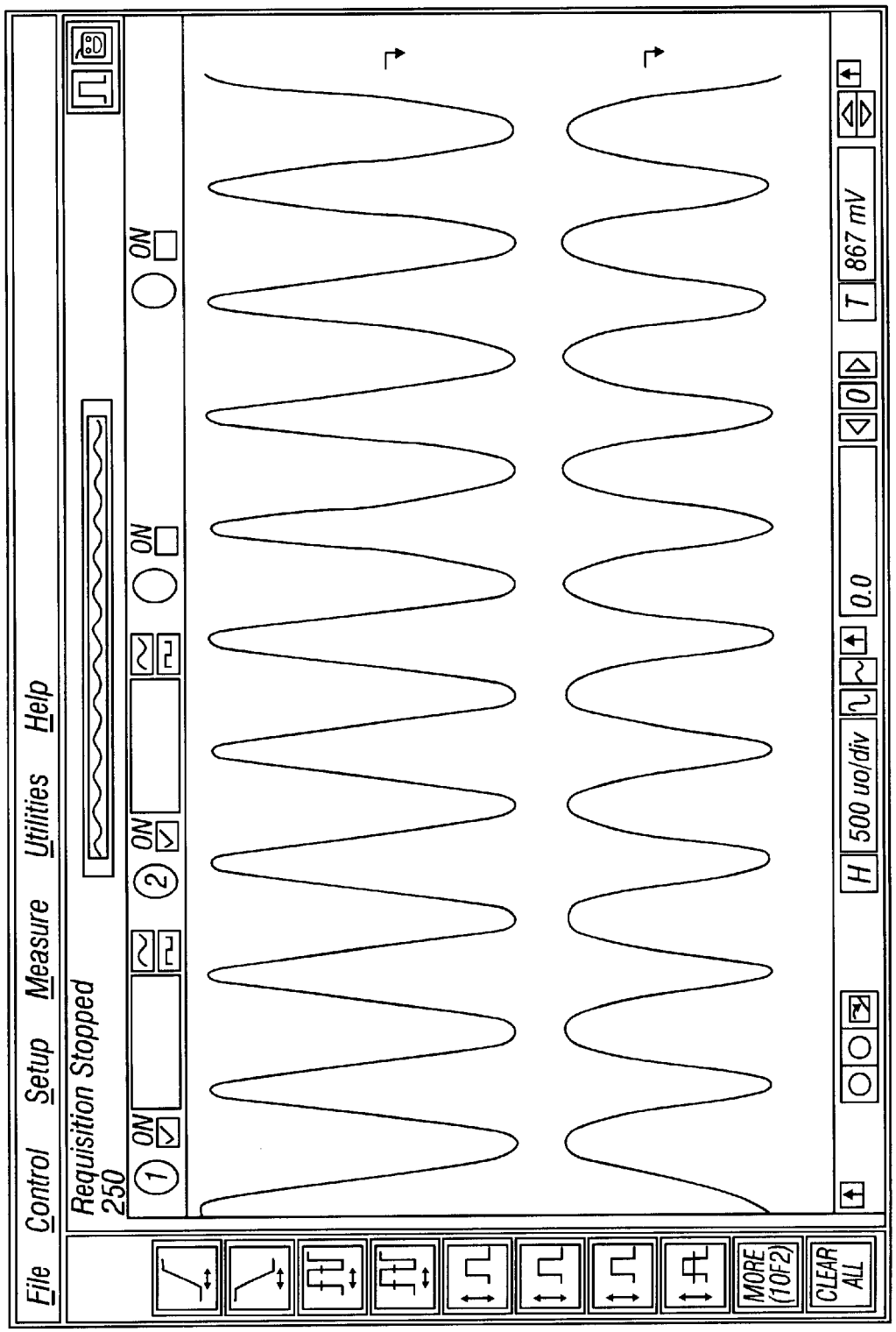
FIGS. 7A and 7B show measured signals as a function of time in a modulator based on the design in FIG. 6 for determining whether the sampling detector is set at an optimized location away from the edge of the modulator substrate.
Figure 7B:
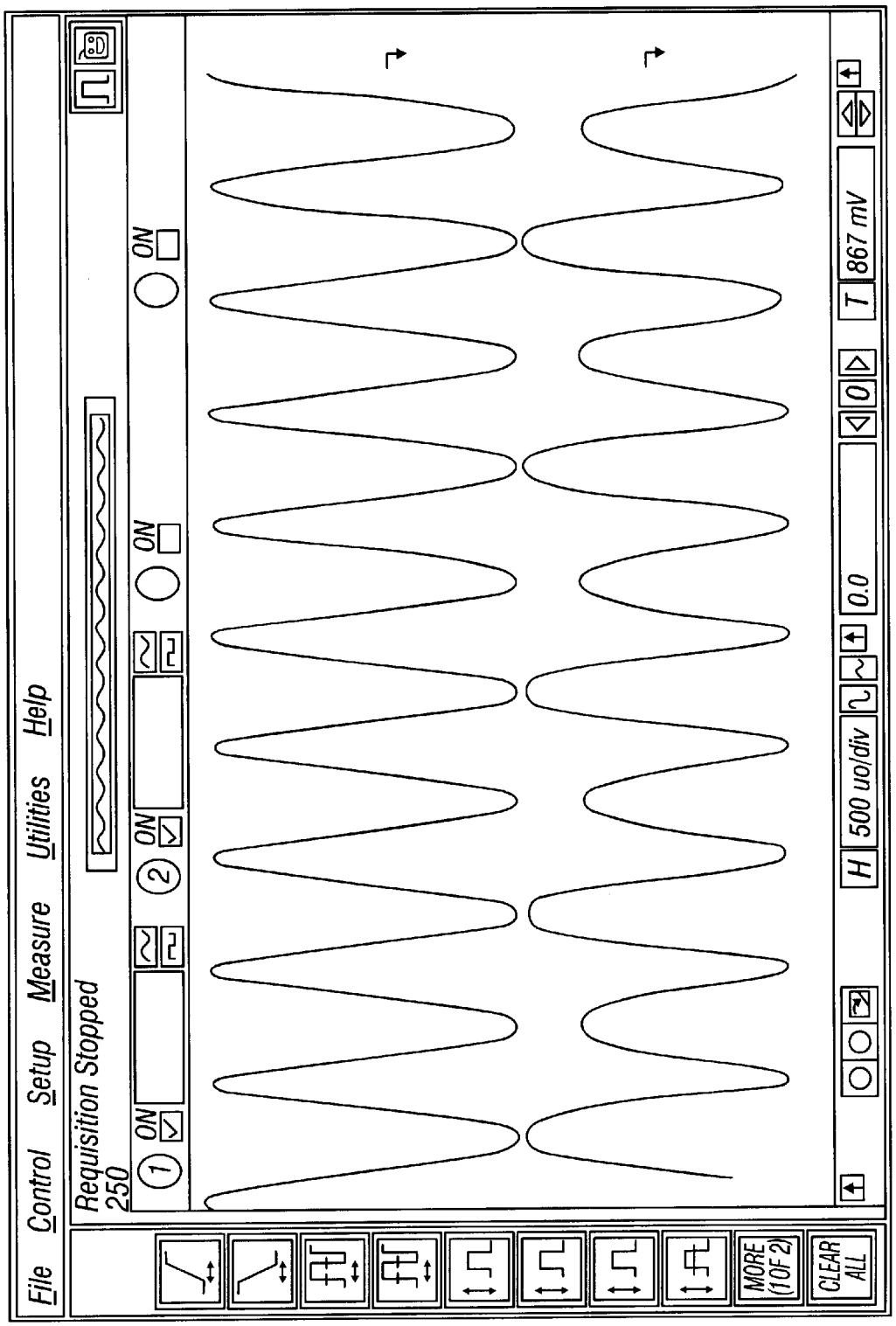

FIGS. 7A and 7B are measurements of a Mach-Zehnder modulator with a sampling detector based on the design in FIG. 6. The top trace in each figure is the measured signal representing the guided output light 108A in the output waveguide 108 which is coupled into the output fiber 142. The lower trace in each figure, on the other hand, represents the measured detector output 152 from the detector 150 that represents the unguided light emanating out of the waveguide 108. The lower trace is phase shifted from the upper trace to be complementary in time. FIG. 7A shows the measured detector signal 152 when the detector 150 is at the optimized position $y_o$. FIG. 7B shows the measured detector signal 152 when the detector 150 is away from the optimized position $y_o$ where a modulation peak has a different amplitude with the immediate adjacent modulation peak but the same amplitude with the next adjacent modulation peak.

FIG. 8 shows the steps for placing the detector 150 at the optimized position $y_o$ according to one embodiment. First, the detector 150 is situated above the fiber 142 (x=0) with a selected height $z_s$. Then the detector 150 is adjusted along the y direction to be away from the edge of the interface 132 to a position where the peak signals of the detector output 152 are substantially equal. Finally, the position of the detector 150 is fixed at the optimized position $y_o$.

FIG. 9 shows one exemplary implementation 900 of an optical Mach-Zehnder modulator 910 with an optical sampling detector 150 based on the design in FIG. 6. The modulator device 900 includes a modulator housing 902 that encloses the optical modulator 910 and the optical detector 150 with one end optically coupled to an input fiber 962 for receiving an input optical signal and another end optically coupled to an output fiber 952 for exporting a modulated output signal. The modulator 910 may be formed on an electro-optic crystal substrate such as a lithium Niobate or other substrates exhibiting electro-optic effects. Circuits 912 are engaged to the modulator housing 902 with a feedthrough design and are electrically coupled to the modulator 910 to provide electrical bias and electrical modulation control signal. The housing 902 may be hermetically sealed. Two fiber support blocks 930 and 940 are respectively formed on two ends of the modulator 910 to engage output fiber 904 and input fiber 903 to the modulator 910. The fiber 904 is engaged to the housing 903 through a fiber fitting unit 950 mounted on the end of the housing 902 and extends outside the housing 902 as the fiber 952 which may be generally covered with the fiber protection buffer material. Similarly, a fiber fitting unit 960 is mounted on the opposite end of the housing 902 to engage the input fiber 903 to the housing 902. The portion of the input fiber 903 outside the housing 902 is indicated by the numeral 926 which may be generally covered with the fiber protection buffer material. An additional elastomer strain release unit may be placed over the fitting 950 to protect the fiber. The input fiber 903 may be a polarization maintaining fiber and the output fiber 904 may be a single-mode fiber. The optical detector 150 may be mounted to a detector mounting block 920 which has the electrical connection for the detector 150. A feedthrough port 922 may be formed on the housing 902 to provide an electrical conduit to the electrical connection of the detector 150.

FIG. 10 shows the portion B of the modulator device 900 in a sectional view along the direction A—A. In this embodiment, the crystal 1010 is an electro-optic material and forms the substrate for the modulator 910 on which the waveguides for the Mach-Zehnder modulator are fabricated. As illustrated, the fiber 904 is held by the fiber support block 930 to have its receiving end facet against the output facet of the output waveguide at the edge of the crystal 1010. The fiber support block 930 may be formed of a transparent material, e.g., such as a glass, to allow transmission of the unguided complementary signal to the detector 150. The detector mounting block 920 may be mounted on top of the fiber support block 930 or an inner part of the housing 902 to place the detector 150 at a selected position $y_s$ above the fiber 904 and away from the edge of the crystal 1010. FIG. 10 shows the implementation in which the interior of the housing 902 has platforms 1030 at two opposite sides of the fiber 904 to support the detector mounting block 920 above the fiber 904 and the fiber support block 930.

Figure 11A:
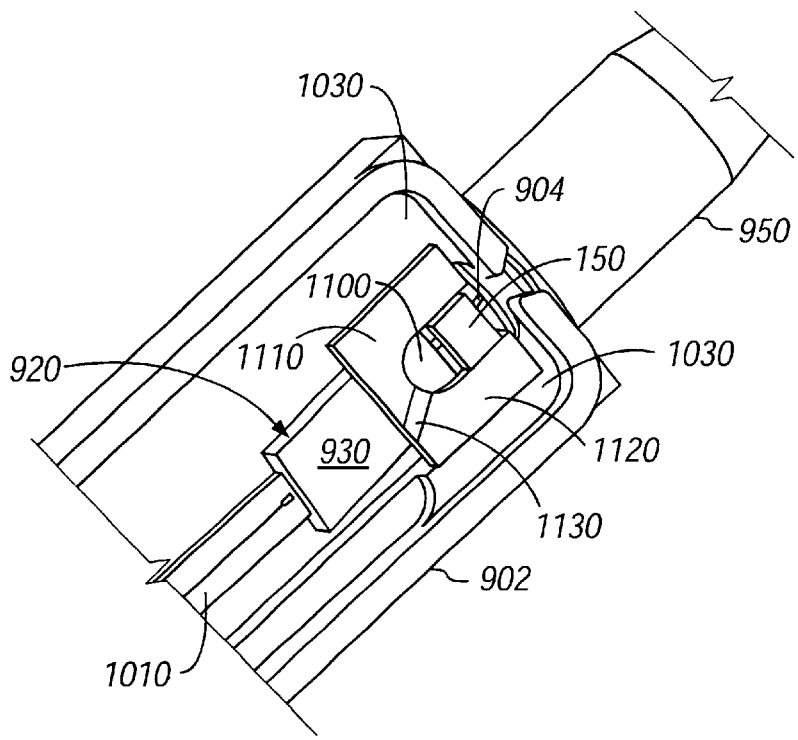
Figure 11B:
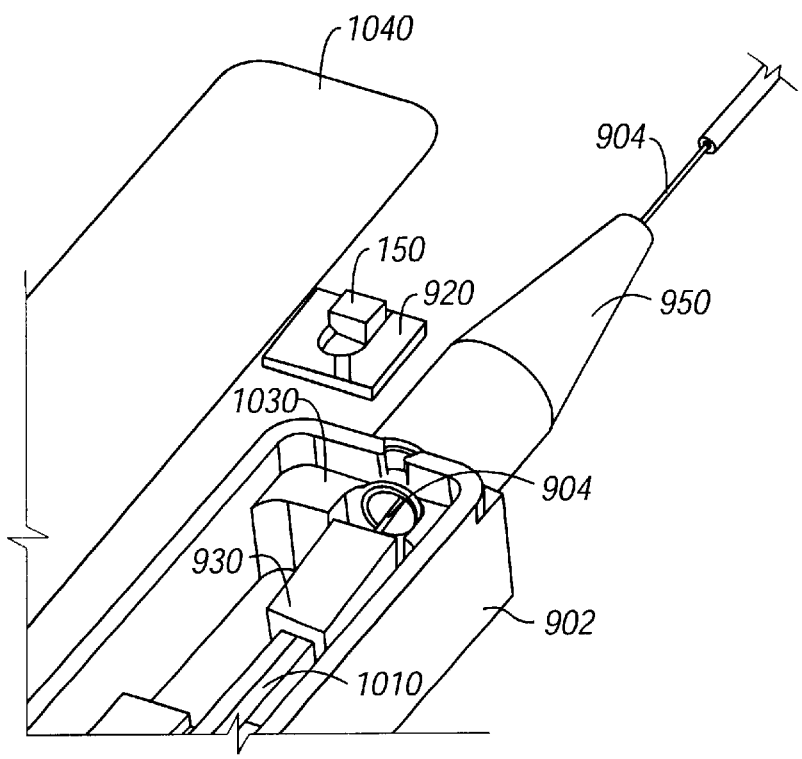
Figure 11C:
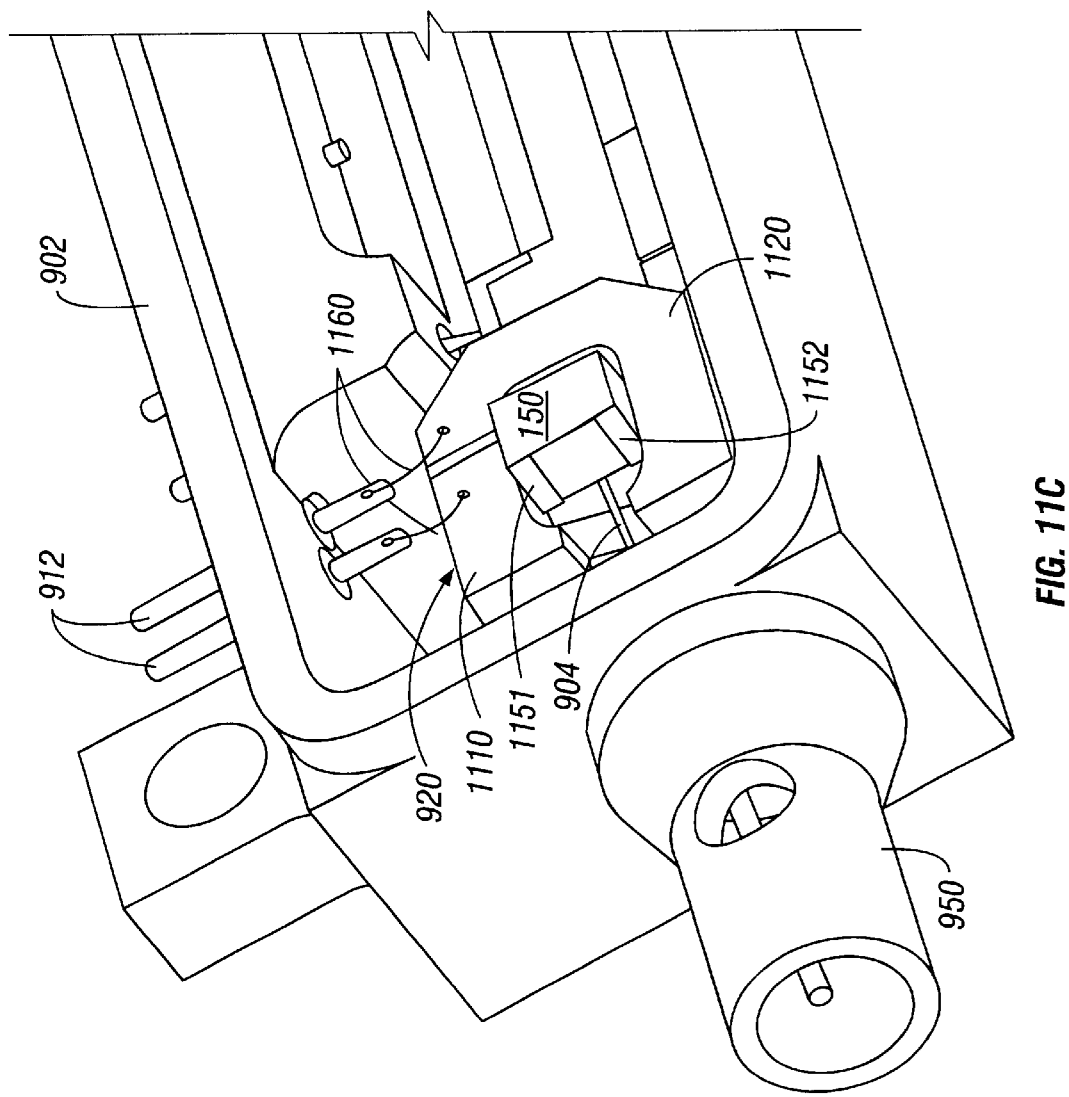

FIGS. 11A, 11B, and 11C show additional details of the detector 150 and its mounting mechanism. In FIG. 11A, the detector mounting block 920 is shown to have a horseshoe design where an opening 110 is formed to receive and hold the detector 150. The top surface of the detector mounting block 920 has anode and cathode electrodes 1110 and 1120 that are separated from one another by a gap 1130. In one implementation, the detector mounting block 920 may be formed from a ceramic material coated with a conductive film. The conductive film is patterned to form the electrodes 1110 and 1120. The detector 150 is electrically coupled to the electrodes 1110 and 1120. FIG. 11B shows an exploded view of the detector mounting mechanism where a cover 1040 for the housing 902 is also shown.

FIG. 11C shows the electrical connections for the detector 150. The electrical feedthrough 112 has two conductors with their ends inside the housing 902 respectively connected to the electrodes 1110 and 1120 via conductive wires 1160. The electrical connections between the detector 150 and the electrodes 1110 and 1120 may be formed by using a conductive epoxy at two separate contact locations 1151 and 1152.

It is recognized that, the material of the substrate 101 and the material for the fibers 903 and 904 may be different and thus have different coefficients of thermal expansion. An interface between the substrate 101 and the fiber, hence, may be subject to an axial stress along the fiber due to a variation in temperature. This axial stress is undesirable because it may cause misalignment between the waveguide in the substrate 101 and the fiber and hence cause unwanted optical loss. In addition, the housing 902 in which the modulator 920 is mounted may also be formed of a material (e.g., a metal) different from the substrate 101. This may cause additional thermal stresses. Table I lists the coefficients of thermal expansion of different materials that may be used in the above modulator devices where a metallic alloy such as Kovar may be used to construct the housing 902 and a metallic alloy Invar may be used as inserts between dissimilar materials to reduce the overall thermal expansion as discussed below.

TABLE I

| MATERIAL | COEFFICIENT OF THERMAL EXPANSION C(PPM/° C.) |
|---|---|
| Lithium Niobate (modulator) | 17.9 |
| Kovar (housing) | 5.5 |
| Glass Fiber | 0.8 |
| Copper (end caps) | 17.6 |
| Invar (insert) | 1.2 |

One aspect of this application is to provide an athermal design for the waveguide-to-fiber interface to reduce thermal stresses when the unit experiences a variation in temperature. The athermal design may be achieved by selecting materials with different coefficients of thermal expansion to reduce the net thermal effect at one or more selected locations, e.g., the interface between the waveguide and the fiber.

Figure 12:
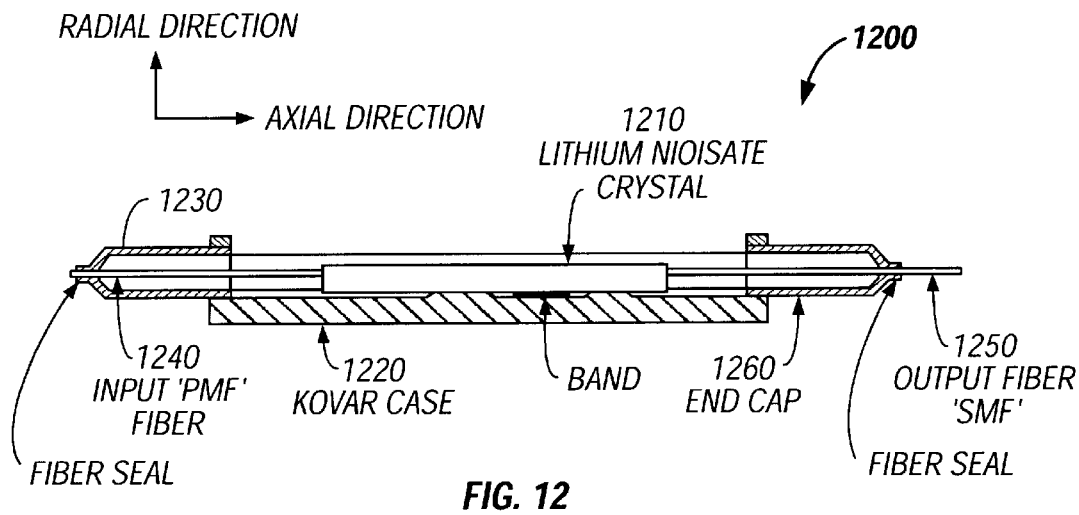
FIGS. 12 and 13 show athermal designs of the modulator along axial and radial directions of the fibers, respectively.

FIG. 12 shows one embodiment 1200 of an athermal design in which the lithium niobate crystal 1210 is bonded to the modulator housing 1220 formed of the alloy Kovar. End caps 1230 and 1260 are engaged to the housing 1220 for holding the input fiber 1240 and output fiber 1250, respectively. The athermal design for the fiber to crystal attachment is to set the following to zero:

C(output fiber)L(input fiber)+C(crystal)L(crystal)+C(input fiber)L(output fiber)−[C(input end cap)L(input end cap)+C(housing)L(housing)+C(output end cap)L(output end cap)]

where C represents the coefficient of thermal expansion of each component and L the length of each component. In implementation, the materials and the lengths of the components are selected to make the total sum substantially zero. In this example, the end caps are made of copper to achieve a large amount of thermal expansion and the housing is made of Kovar to achieve a small amount of thermal expansion in order to satisfy the above athermal design.

The above athermal design is to reduce the axial thermal expansion along the fiber's longitudinal direction. The thermal stress along the radial direction may also be adverse to the modulator module because such stress may cause misalignment. In addition, the redial stress exerted on the fiber at the end of the end caps may change the polarization property of the PM fibers.

Figure 13:
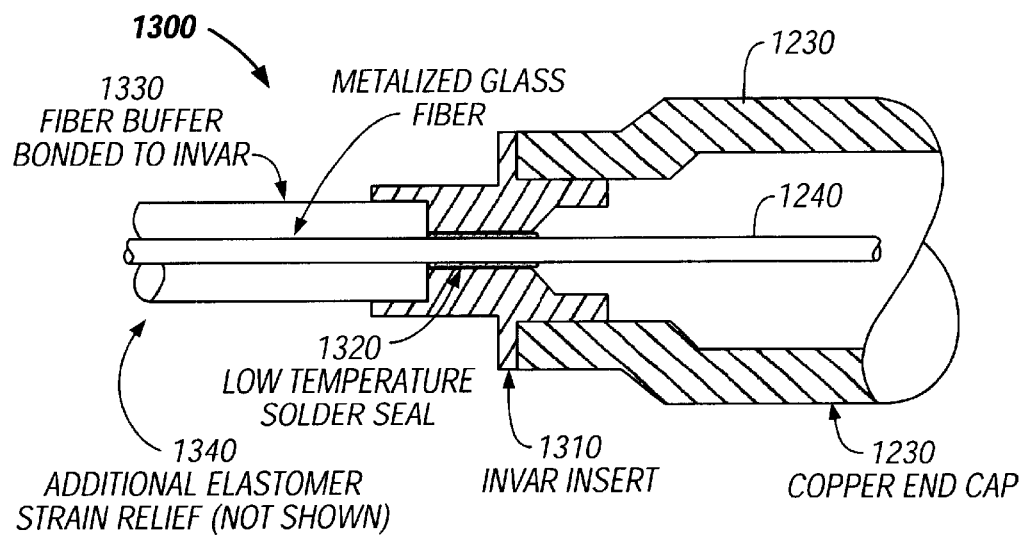

FIG. 13 shows one embodiment 1300 of the engagement of the end cap 1230 and the fiber 1240. As described above, the end cap 1230 may be formed of a metal such as copper with a large coefficient of thermal expansion to meet the athermal design in the axial direction. Under this design, the coefficients of thermal expansion of the fiber and the end caps are large. Hence, the thermal-induced stress along the radial direction is large and is undesirable. To reduce this radial thermal stress, an insert member 1310 is inserted between the copper end cap 1230 and the fiber 1240. The thermal expansion of the insert member 1310 is selected to be close to that of the fiber glass and is smaller than that of the end cap 1230. In particular, the radial dimension of the insert member 1310 is made to be greater than that of the end cap 1230 to dominate the radial dimension to reduce the effect of the radial strain caused by the end cap 1230. The insert member 1310 may be formed of Invar whose CTE of 1.2 PPM/° C. closely matches that of the glass fiber (0.8 PPM/° C.). The Invar insert may be brazed or press fitted into the copper end cap 1230 prior to assembly. The surface of the fiber 1240 may be metalized and a low-temperature indium alloy solder 1320 may be used to seal the interface between the metalized fiber and the Invar insert member. In this design, the effect of the dimensional variance of the copper end cap on the fiber is substantially reduced.

Figure 14:
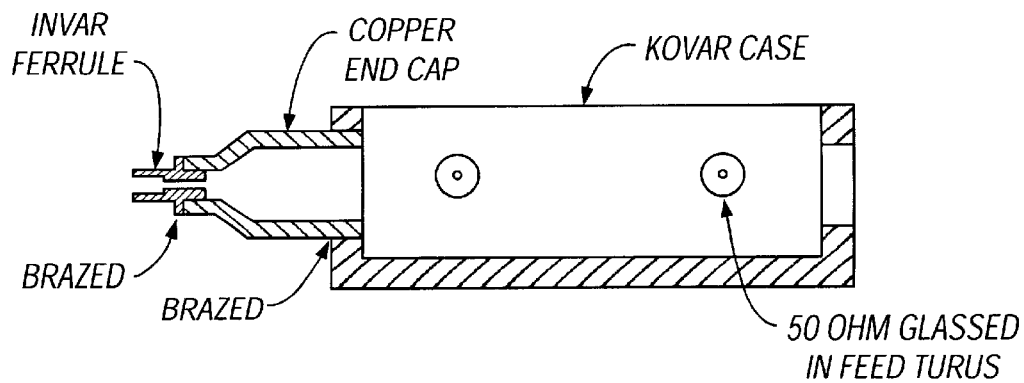
FIG. 14 shows assembly of an end cap to a modulator housing according to one embodiment.

FIG. 14 shows some assembly details of the above design. The Kovar housing is preassembled with glass beaded feedthrus and case grounding pins for subsequent attachment of the electrical connections to the crystal to provide access to a printed circuit board assembly. The input end cap with the brazed in Kovar ferrule is brazed to the housing. Next, the preassembled crystal-and-fiber assembly may be inserted from the open end of the housing assembly. The input PMF fiber is first inserted and threaded through the input Invar ferrule. The crystal is then positioned and bonded to the bottom of the housing with a compliant adhesive in the central portion of the bottom of the crystal and the Kovar housing. Portions of the Kovar housing are in contact with the crystal outside of the bond joint. Prior to introducing the crystal, or possibly subsequent to its bonding in the housing, the exit ferrule and end cap is slid down the exit fiber. The end cap is brought up to the Kovar housing and soldered with a low-temperature solder pre-form material by using, e.g., a heated gas heat source. After the end cap is hermetically sealed by means of the solder to the housing, the Invar ferrules are solder sealed around the metalized fiber. A buffer is slid along the exit SMF fiber and epoxy bonded to the Invar ferrule. Electrical connections may be made from the lithium niobate crystal to the feedthrus or to a housing ground. After functional hookup of the crystal is achieved, the photo detector is installed at the desired location as described above. After all internal assembly operations are accomplished, the housing cover is put in place and seam welded by using established manufacturing assembly processes to effect a hermetically sealed assembly.

Although the present disclosure only describes a few embodiments, it is understood that various modifications and enhancements may be made without departing from the following claims.

What is claimed is:

1. A device, comprising:
   a substrate;
   a Mach-Zehnder optical modulator formed on said substrate and having an input waveguide to receive an input optical signal and an output waveguide to output a guided output optical signal; and
   an optical detector positioned away from an edge of said substrate along a direction of said output waveguide to receive an optical signal that is not guided by said output waveguide and is complementary to said guided output optical signal.

2. The device as in claim 1, wherein the position of said optical detector is selected to make adjacent signal peaks in time domain substantially equal in amplitude.

3. The device as in claim 1, further comprising:
   a fiber having a fiber facet engaged to an output facet of said output waveguide to receive said guided output optical signal;
   a fiber support block engaged to said fiber to hold said fiber in place relative to said output waveguide; and
   a detector mounting block engaged to hold said optical detector above said fiber and away from said output facet of said output waveguide.

4. The device as in claim 3, wherein said detector mounting block is formed of a ceramic block which has two electrodes formed on one surface said ceramic block and electrically coupled to said optical detector.

5. The device as in claim 1, further comprising a bias feedback control unit coupled to receive a detector signal from said optical detector and operable to control a DC bias in said Mach-Zehnder modulator in response to said detector signal to maintain a DC bias.

6. A method, comprising:

placing an optical detector away from an output waveguide of a Mach-Zehnder modulator to receive unguided light that is complementary to a guided signal in said output waveguide; and processing a detector output from said optical detector representing said unguided light to obtain information contained in said guided signal, without directly intercepting said guided signal.

7. The method as in claim 6, further comprising selecting a position of said optical detector to reduce collection of light that is not complementary to said guided signal.

8. The method as in claim 6, further comprising adjusting the position of said optical detector until adjacent peaks in said detector output in time domain are substantially equal in amplitude.

9. The method as in claim 6, further comprising using said detector output to monitor a DC bias in said Mach-Zehnder modulator.

10. The method as in claim 9, further comprising using said detector output to adjust said DC bias.

11. The method as in claim 6, further comprising using said detector output to monitor a bit error rate in said guided signal.

12. A device, comprising:

a substrate;

a Mach-Zehnder modulator formed in said substrate to receive an input optical signal to produce an output optical signal;

an output fiber coupled to one edge of said substrate to receive said output optical signal;

an optical detector, positioned above said output fiber and away from said edge of said substrate to receive an optical monitoring signal that is complementary to said output optical signal; and a device housing hermetically enclosing said substrate, said Mach-Zehnder modulator, at least a portion of said output fiber, and said optical detector.

13. The device as in claim 12, wherein said substrate is formed of an electro-optic material.

14. The device as in claim 12, wherein said optical detector is located at a position along said fiber at which adjacent signal peaks in said optical monitoring signal in time domain are substantially equal in amplitude.

15. The device as in claim 12, wherein an interface between said substrate and said fiber is substantially athermal.

16. The device as in claim 12, further comprising:

an end cap engaged to one end of said device housing having an opening to allow said fiber to go through; and an insert member engaged to said opening and located between said fiber and said end cap to hold said fiber, said insert member having a coefficient of thermal expansion smaller than a coefficient of thermal expansion of said end cap and close to a coefficient of thermal expansion of said fiber, said insert member having a dimension along a radial direction of said fiber greater than a radial dimension of said end cap.

17. The device as in claim 12, wherein said substrate includes a lithium niobate crystal.

18. The device as in claim 12, further comprising a feedback loop that controls an electrical bias in said Mach-Zehnder modulator in response to said optical monitoring signal.

* * * * *